US009817961B2

(12) United States Patent
Lu et al.

(10) Patent No.: US 9,817,961 B2
(45) Date of Patent: Nov. 14, 2017

(54) WORKING METHOD OF SMART KEY DEVICE

(71) Applicant: Feitian Technologies Co., Ltd., Beijing (CN)

(72) Inventors: Zhou Lu, Beijing (CN); Huazhang Yu, Beijing (CN); Liming Shao, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 153 days.

(21) Appl. No.: 14/888,958

(22) PCT Filed: Apr. 15, 2014

(86) PCT No.: PCT/CN2014/075371
§ 371 (c)(1),
(2) Date: Nov. 4, 2015

(87) PCT Pub. No.: WO2014/173244
PCT Pub. Date: Oct. 30, 2014

(65) Prior Publication Data
US 2016/0117493 A1 Apr. 28, 2016

(30) Foreign Application Priority Data
Apr. 27, 2013 (CN) .......................... 2013 1 0151543

(51) Int. Cl.
G06F 21/34 (2013.01)
(52) U.S. Cl.
CPC .................. G06F 21/34 (2013.01)

(58) Field of Classification Search
CPC ...... H04B 7/26; H04L 61/6022; H04W 4/008; H04W 12/04; H04W 12/06; H04W 52/0209; H04W 88/02; G06F 21/34
USPC .......................................................... 726/20
See application file for complete search history.

(56) References Cited

U.S. PATENT DOCUMENTS

| 8,605,906 B2 * | 12/2013 | Huh .................. H04L 63/061 380/270 |
| 8,886,997 B2 | 11/2014 | Boisde et al. |
| 2008/0307140 A1 * | 12/2008 | Goldstein ............... G06F 13/24 710/260 |

* cited by examiner

Primary Examiner — Baotran N To
(74) Attorney, Agent, or Firm — Hammer & Associates, P.C.

(57) ABSTRACT

A working method of a smart key device, in which it includes: power on the smart key device; the smart key device reads Bluetooth module parameters, and determines whether the Bluetooth module parameters are read successfully, if the parameters are read successfully, switch the Bluetooth module to connection state, and execute a next step; if the parameters are not read successfully, execute the next step directly; the smart key device determines whether working voltage is lower than a preset value, if yes, prompt low voltage state, and the device is turned off after a first preset time; if no, the device tests working voltage and waits for an interrupt trigger signal; when the device receives the interrupt trigger signal, enter corresponding interruption according to the interrupt trigger signal, after execute corresponding interrupt processing, exit corresponding interruption and continue to test the working voltage. The present invention can unify interfaces of mobile devices, so as to make mobile payment safer and more convenient.

20 Claims, 6 Drawing Sheets

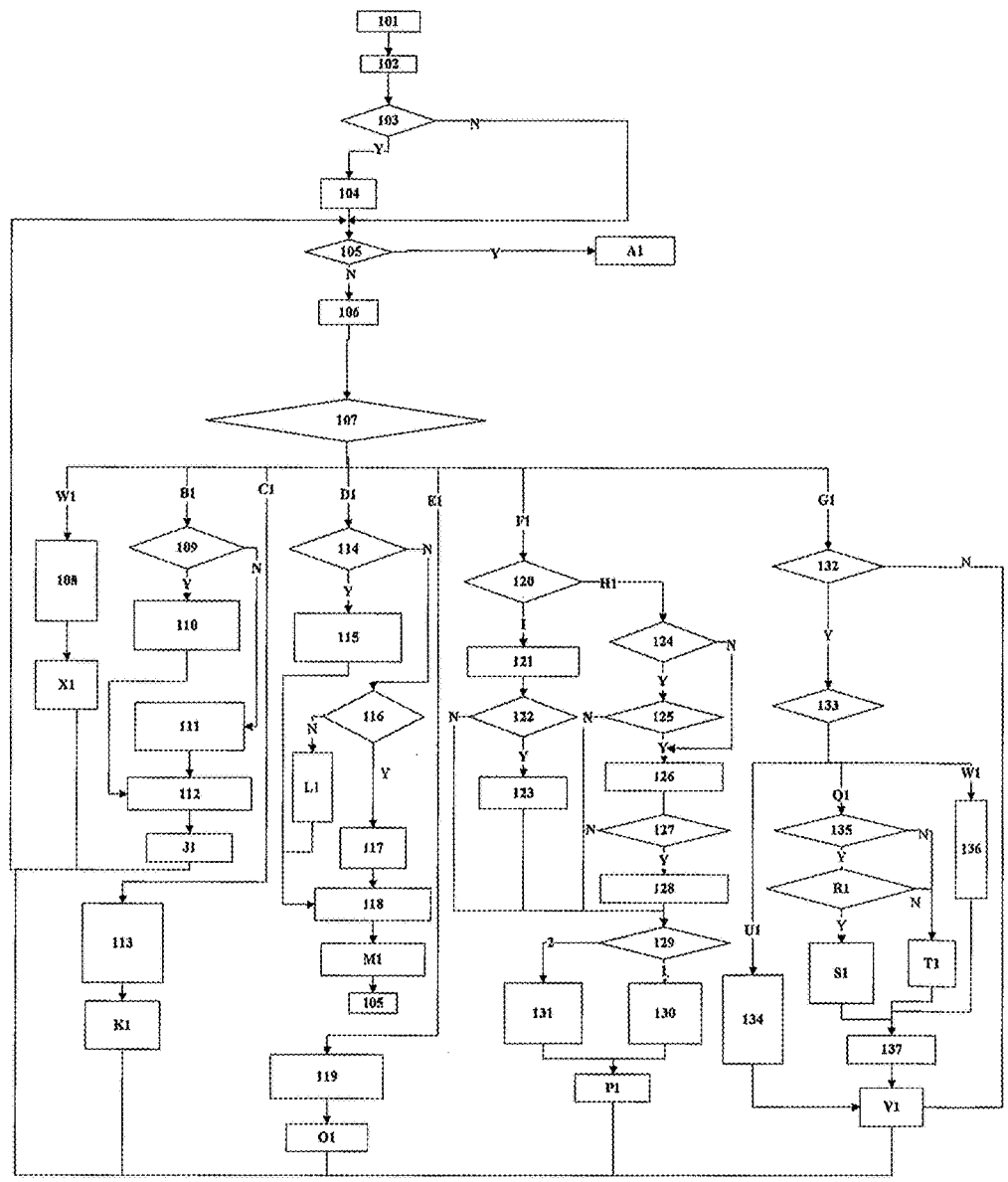

Fig. 5A

101: power on the smart key device and start to initialize
102: turn on an interruption
103: the smart key device reads Bluetooth module parameters and determines whether they are successfully read
104: switch the Bluetooth module to connection state
105: the smart key device determines whether a working voltage is lower than a preset value
106: continue to execute step 105, and receive an interrupt trigger signal
107: the smart key device determines type of the interrupt trigger signal
108: reset a timer and set a dormancy identification and enter dormancy
109: determine whether the dormancy identification is set
110: reset the dormancy identification, turn on an USB channel enable, clear the identity identification
111: turn on the USB channel enable, turn off the Bluetooth channel enable, clear the identity identification
112: clear a keypad waiting identification, display initialization
113: turn off the USB channel enable, turn on the Bluetooth channel enable, clear the identity identification
114: determine whether the dormancy identification is set 115: reset the dormancy identification, turn on the Bluetooth channel enable, clear the identity identification
116: determine whether the device can connect to an upper computer via a USB interface
117: turn off the Bluetooth channel enable
118: clear the keypad waiting identification, display initialization
119: set the dormancy identification, turn off the Bluetooth channel enable, clear the identity identification
120: save a channel identification, determine type of the instruction
121: parse the instruction to get verify information
122: determine whether user's identity is legal
123: save the identity identification
124: determine whether the instruction needs to perform identity verification
125: determine whether to get the identity identification
126: execute a corresponding instruction operation
127: determine whether it needs to wait for keypad operation
128: set a keypad waiting identification
129: determine the channel identification
130: return the instruction response to the upper computer via the USB interface
131: return the corresponding instruction response to the upper computer via the Bluetooth interface
132: determine whether the keypad waiting identification is set
133: determine type of the keypad
134: display key information via page up/down keypad on LCD
135: determine whether a mark for finishing message display is valid
136: display on LCD operation canceled
137: clear the keypad waiting identification
A1: prompt low voltage state and turn off the device after a first preset time
B1: insert USB interruption
C1: pull USB interruption
D1: Bluetooth connection interruption
E1: Bluetooth disconnection interruption
F1: instruction interruption
G1: keypad interruption
H1: other
I1: identity verification instruction
J1: exit insert USB interruption
K1: exit insert USB interruption
L1: turn on Bluetooth channel enable, clear identity identification
M1: exit Bluetooth connection interruption
O1: exit Bluetooth disconnection interruption
P1: exit instruction interruption
Q1: enter keypad
R1: use user's private key to sign saved hash result, determine whether signature is successful
S1: prompt operation success on LCD
T1: operation failed on LCD
V1: exit keypad interruption
W1: timer interruption
X1: when being waken up, exit timer interruption

Fig.5B

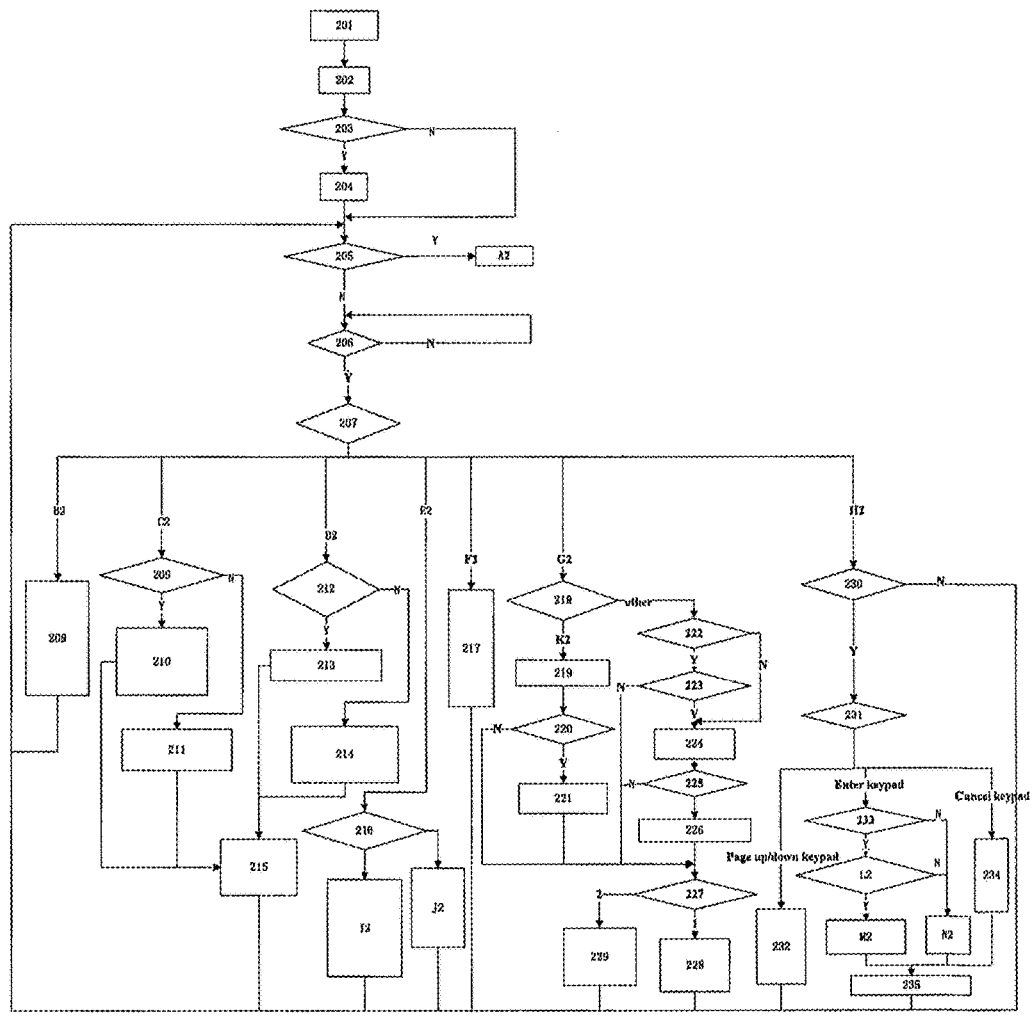

Fig. 6A

201: power on a smart key device and begin to initialization
202: turn on the interruption
203: the smart key device reads a Bluetooth module parameter, determine whether they are successfully read
204: switch the Bluetooth module to connection state
205: the smart key device determines whether working voltage is lower than a preset value
206: the smart key device determines whether interrupt identification exits
207: the smart key device determine type of interrupt identification
208: turn off USB channel enable, turn on Bluetooth channel enable, clear pull USB interrupt identification and identity identification
209: determine whether the smart key device connects to an upper computer via a Bluetooth interface
210: turn off Bluetooth channel enable, turn on USB channel enable, and clear the insert USB interrupt identification and the identity identification
211: turn on USB channel enable, clear the insert USB interrupt identification
212: determine whether the smart key device connects to the upper computer via USB interface
213: clear the Bluetooth connection interrupt identification
214: turn on Bluetooth channel enable, and clear Bluetooth connection interrupt identification and the identity identification
215: clear a keypad waiting identification, and initialization is displayed on LCD
216: determine whether the smart key device connects to the upper computer via the USB interface
217: reset the timer, clear timer interrupt identification
218: save channel identification, determine type of instruction
219: parse instruction to get verify information
220: determine whether the user's identity is legal according to the verification information
221: save identity identification
222: determine whether the instruction is an instruction which needs to perform identity verification 223: determine whether can get identity identification
224: execute corresponding instruction operation
225: determine whether need to wait for keypad operation
226: set keypad waiting identification
227: determine channel identification
228: return corresponding instruction response to the upper computer via the USB channel
229: return corresponding instruction response to the upper computer via the Bluetooth channel
230: determine whether keypad waiting identification is set
231: determine type of keypad
232: display the key information on LCD via the page up/down key
233: determine whether the mark for message displayed finish is valid
234: display on LCD that operation is canceled
235: clear keypad waiting identification
A2: prompt low voltage state, the device is turned off after a first preset time
B2: pull USB interrupt identification
C2: insert USB interrupt identification
D2: Bluetooth connection interrupt identification
E2: Bluetooth disconnection interrupt identification
F2: timer interrupt identification
G2: instruction interrupt identification
H2: keypad interrupt identification
I2: turn off Bluetooth channel enable, clear Bluetooth disconnection interrupt identification and identity identification
J2: clear Bluetooth interrupt identification and identity identification
K2: identity verification instruction
L2: use user's private key to sign hash result, determine whether it is successful
M2: prompt that operation is successful, save signature result
N2: prompt that operation fails

Fig. 6B

WORKING METHOD OF SMART KEY DEVICE

FIELD OF THE PRESENT INVENTION

The present disclosure relates to information security field, in particular, to a working method of a smart key device.

PRIOR ART

A smart key device can greatly meet the need of personal identity verification. In prior art, a smart key device, which is usually a device with a USB interface, connects to a computer via a data communication interface of the computer. Because of high security of a smart key device, many fields which need high security use smart key devices for identity verification to ensure security of operation. For instance, bank system uses smart key devices for identity verification of both tellers and users.

With development of science and technology, it becomes more and more popular to perform identity verification via combination of a smart key device and a handheld device, which is an alternative of computer. However, when using a smart key device, the inventor discovers disadvantages: it is hard to have communication between a handheld device and a smart key, because their interfaces cannot match.

SUMMARY OF THE PRESENT INVENTION

The object of the present invention is to provide a working method of a smart key device, which can make unification of interfaces of mobile devices, so as to make mobile payment become safer and more convenient; a smart key device of the present disclosure can not only realize communication with a data communication interface of a computer, but also connect to a handheld device.

Thus, according to one aspect of the disclosure, a working method of a smart key including:

Step S1, powering up a smart key device and beginning to initialization;

Step S2, reading, by the smart key, Bluetooth module parameters, determining whether the Bluetooth module parameters are successfully read, switching the Bluetooth to connection state and executing Step S3 if the Bluetooth module parameters are successfully read; and executing Step S3 directly if the Bluetooth module parameters are not successfully read;

Step S3, determining, by the smart key device, whether working voltage is lower than a preset value, prompting low voltage state if working voltage is lower than the preset value, and the smart key device turning off after a first preset time; continuing to execute Step S3 if working voltage is not lower than the preset value;

when an interrupt trigger signal which is received by the smart key device is a channel trigger signal, entering channel trigger interruption, and exiting channel trigger interruption after executing corresponding channel trigger setting, and returning to Step S3;

when the interrupt trigger signal which is received by the smart key device is an instruction trigger signal, entering instruction interruption, and saving a channel identification, and determining type of the instruction, if the received instruction is an instruction that need to perform an identity verification before executing instruction operation, perform identity verification for the instruction, if the identity is verified successfully, after executing corresponding instruction operation according to the instruction and returning corresponding instruction response to an upper computer, exiting instruction interruption, and returning to Step S3; if the identity verification fails, after returning error instruction response to the upper computer, exiting instruction interruption, and returning to Step S3; if the received instruction is an instruction that does not need to perform identity verification before executing instruction operation, executing corresponding instruction operation according to the instruction and returning relevant instruction response to the upper computer, and then exiting instruction interruption, and returning to Step S3; wherein the process of executing corresponding instruction operation according to the instruction includes: parsing message data in the instruction to get key data, and performing Hash operation on the message data in the instruction to get and save the Hash result, and then displaying the key data on LCD (liquid crystal display);

when the interrupt trigger signal which is received by the smart key device is a keypad trigger signal, entering keypad interruption, and exiting keypad interruption after keypad processing, and returning to Step S3; wherein the keypad processing includes: determining type of the keypad, if the keypad is an enter keypad, making a signature for the saved Hash result to get a signature result and save it, if the keypad is a canceling keypad, canceling the signature.

Preferably, the method further including: when the interrupt trigger signal which is received by the smart key device is a timer trigger signal, entering timer interruption, and resetting the timer, and setting a dormancy identification to enter dormancy, when waken up, exiting timer interruption, and returning to Step S3.

Preferably, the method further including: when the interrupt trigger signal which is received by the smart key device is a timer trigger signal, entering timer interruption, and resetting the timer, and setting the dormancy identification, and exiting timer interruption, and returning to Step S3; Step S3 further including: determining whether the dormancy identification is set, if yes, entering dormancy, and continuing to execute Step S3 when being waken up; if no, continuing to execute Step S3.

Preferably, the channel trigger signals in the method including: an insert USB trigger signal, a pull USB trigger signal, a Bluetooth connection signal and a Bluetooth disconnection signal; and the instruction trigger signals including: an USB communication signal and a Bluetooth communication signal;

when the interrupt trigger signal which is received by the smart key device is the insert USB trigger signal belonging in the channel trigger signals, entering insert USB interruption, and executing Step A and Step B;

Step A, determining whether the dormancy identification is set, if yes, resetting the dormancy identification, and turning on USB channel enable, and clearing an identity identification, and executing Step B; if no, turning on USB channel enable, and turning off Bluetooth channel enable, clearing identity identification, and executing Step B;

Step B, clearing a keypad waiting identification, and displaying initialization on LCD, and then exiting insert USB interruption;

when the interrupt trigger signal which is received by the smart key device is the pull USB trigger signal belonging in the channel trigger signals, entering pull USB interruption, and executing Step C;

Step C, turning off USB channel enable, turning on Bluetooth channel enable, and clearing the identity identification, and exiting pull USB interruption;

when the interrupt trigger signal which is received by the smart key is the Bluetooth connection signal belonging in the channel trigger signals, entering Bluetooth connection interruption, and executing Step D and Step E;

Step D, determining whether the dormancy identification is set, if yes, resetting the dormancy identification, and turning on Bluetooth channel enable, and clearing the identity identification, and executing Step E; if the dormancy identification is not set, determining whether the smart key device connects to the upper computer via a USB interface, if yes, turning off Bluetooth channel enable, and executing Step E, if no, turning on Bluetooth channel enable, and clearing the identity identification, and executing Step E;

Step E, clearing the keypad waiting identification, displaying initialization on LCD, and exiting Bluetooth interruption;

when the interrupt trigger signal which is received by the smart key device is the Bluetooth disconnection signal belonging in the channel trigger signals, entering Bluetooth disconnection interruption, and executing Step F;

Step F, setting the dormancy identification, turning off Bluetooth channel enable, clearing the identity identification, and then exiting Bluetooth disconnection interruption; or when the interrupt trigger signal which is received by the smart key device is the insert USB trigger signal belonging in the channel trigger signals, entering insert USB interruption, and executing Step A and Step B;

Step A, determining whether the dormancy identification is set, if yes, resetting the dormancy identification, and turning on USB channel enable, clearing the identity identification, and executing Step B; if the dormancy identification is not set, determining whether the smart key device connects to the upper computer via a Bluetooth interface, if yes, turning off USB channel enable, and executing Step B, if no, turning on USB channel enable, clearing the identity identification, and executing Step B;

Step B, clearing the keypad waiting identification, displaying initialization on LCD, and exiting insert USB interruption;

when the interrupt trigger signal which is received by the smart key device is the pull USB trigger signal belonging in the channel trigger signals, entering pull USB interruption, and executing Step C;

Step C, determining whether the smart key device connects to the upper computer via the Bluetooth interface, if yes, exiting pull USB interruption; if no, setting the dormancy identification, and turning off USB channel enable, clearing the identity identification, and exiting pull USB interruption;

when the interrupt trigger signal which is received by the smart key device is the Bluetooth connection signal belonging in the channel trigger signals, entering Bluetooth connection interruption, and executing Step D and Step E;

Step D, determining whether the dormancy identification is set, if yes, resetting the dormancy identification, and turning on Bluetooth channel enable, clearing the identity identification, and executing Step E; if no, turning off USB channel enable, and turning on Bluetooth channel enable, and clearing the identity identification, executing Step E;

Step E, clearing the keypad waiting identification, displaying initialization on LCD, exiting Bluetooth connection interruption;

when the interrupt trigger signal which is received by the smart key device is the Bluetooth disconnection signal belonging in the channel trigger signals, entering Bluetooth disconnection interruption, and executing Step F;

Step F, determining whether the smart key device connects to the upper computer via an USB interface, if yes, turning off Bluetooth channel enable, turning on USB channel enable, and clearing the identity identification, exiting Bluetooth disconnection interruption, if no, turning off Bluetooth channel, and clearing the identity identification, setting the dormancy identification, and exiting Bluetooth disconnection interruption;

in the method, when the instruction which does not need to perform an identity verification is an instruction for identity verification, the procedure that executing corresponding instruction operation according to the instruction, and returning corresponding instruction response to the upper computer including: clearing the identity identification, and then parsing the instruction for identity verification to get a verification information, and determining whether an user's identity is legal according to the verification information, if yes, saving the identity identification, and returning a response that the identity is verified successfully to the upper computer according to a currently saved channel identification, if no, returning a response that the identity verification fails to the upper computer according to the currently saved channel identification;

after executing corresponding instruction operation according to the instruction, the procedure further including: determining whether need to wait for keypad operation, if yes, setting the keypad waiting identification, and then returning a corresponding instruction response to the upper computer, if no, returning the corresponding instruction response to the upper computer;

after entering keypad interruption, the procedure further including: determining whether the keypad waiting identification is setting, if yes, executing keypad processing, and then exiting keypad interruption, if no, exiting keypad interruption directly.

According to the another aspect, a working method of a smart key may also including:

Step S1, powering up a smart key device and beginning to initialization;

Step S2, reading, by the smart card device, Bluetooth module parameters, and determining whether the Bluetooth module parameters are successfully read, if yes, switching the Bluetooth module to connection state and executing Step S3, if no, executing Step S3 directly;

Step S3, determining, by the smart key device, whether working voltage is lower than a preset value, if yes, prompting low voltage state, and the smart key device turning off after a first preset time; if no, executing Step S4;

Step S4, determining, by the smart key device, whether an interrupt identification exists, if yes, executing Step S5, if no, continuing to execute Step S3;

turning on interruption before Step S4;

when an insert/pull USB trigger signal is received by the smart key device, entering insert/pull USB interruption, and saving an insert/pull USB interrupt identification, and then exiting insert/pull USB interruption;

when a Bluetooth connection/Bluetooth disconnection signal is received by the smart key device, entering Bluetooth connection/Bluetooth disconnection interruption, and saving a Bluetooth connection/Bluetooth disconnection interrupt identification, and then exiting Bluetooth connection/Bluetooth disconnection interruption;

when an instruction trigger signal is received by the smart key device, entering instruction interruption, and saving an instruction interrupt identification and a current channel identification, and then exiting instruction interruption;

wherein the instruction trigger signals include a USB communication signal and a Bluetooth communication signal;

when a keypad trigger signal is received by the smart key device, entering keypad interruption, and saving a keypad interrupt identification, and then exiting keypad interruption;

Step S5, determining, by the smart key device, type of the interrupt identification;

when the interrupt identification is the insert/pull USB interrupt identification, executing corresponding operation of USB channel, and then returning to Step S3;

when the interrupt identification is the Bluetooth connection/Bluetooth disconnection interrupt identification, executing corresponding operation of Bluetooth channel, and then returning to Step S3;

when the interrupt identification is the instruction interrupt identification, determining type of the instruction, if the received instruction is an instruction that need to perform identity verification before executing instruction operation, perform identity verification, if the identity is verified successfully, executing corresponding instruction operation according to the instruction and returning corresponding instruction response to the upper computer, and returning to Step S3; if the identity verification fails, returning error instruction response to the upper computer, and then returning to Step S3; if the received instruction is an instruction that does not need to perform identity verification before executing instruction operation, executing corresponding instruction operation according to the instruction and returning relevant instruction response to the upper computer, and returning to Step S3; wherein the process of executing corresponding instruction operation according to the instruction includes: parsing message data in the instruction to get key data, and performing Hash operation on the message data in the instruction to get and save the Hash result, and then displaying key data on LCD (liquid crystal display);

when the interrupt identification is the keypad interrupt identification, executing keypad processing, and then returning to Step S3; wherein the procedure of keypad processing includes that determining type of the keypad, if the key is an enter keypad, making a signature for the saved Hash result to get a signature result and save it, if the keypad is a cancel key, canceling the signature.

Preferably, in the method, when the interrupt identification is the insert/pull USB interrupt identification, executing corresponding operation of USB channel, including: if the identification is the pull USB interrupt identification, executing Step A;

Step A, turning off USB channel enable, turning on Bluetooth channel enable, clearing the pull USB interrupt identification, and clearing the identity identification;

if the identification is the insert USB interrupt identification, executing Step B and Step C;

Step B, determining, by the smart key device, whether connects to the upper computer via a Bluetooth interface, if yes, turning off Bluetooth channel enable, and turning on the USB channel enable, clearing the insert USB interrupt identification and the identity identification, and then executing Step C; if no, turning on USB channel enable, clearing the insert USB interrupt identification, and then executing Step C;

Step C, clearing the keypad waiting identification, and displaying initialization on LCD;

when the interrupt identification is the Bluetooth connection/Bluetooth disconnection interrupt identification, executing corresponding operation of Bluetooth channel, including: if the identification is the Bluetooth connection interrupt identification, executing Step D and Step E;

Step D, determining whether the smart key device communicates with the upper computer via an USB interface, if yes, clearing the Bluetooth connection interrupt identification, and executing Step E; if no, turning on Bluetooth channel enable, clearing the Bluetooth connection interrupt identification and the identity identification, and executing Step E;

Step E, clearing the keypad waiting identification, displaying initialization on LCD;

if the identification is the Bluetooth disconnection interrupt identification, executing Step F;

Step F, turning off Bluetooth channel enable, turning on USB channel enable, clearing the Bluetooth disconnection interrupt identification, and clearing the identity identification; or when the interrupt identification is the insert/pull USB interrupt identification, executing corresponding operation of USB channel, including: if the identification is the pull USB interrupt identification, executing Step A;

Step A, turning off USB channel enable, turning on Bluetooth channel enable, and clearing the USB interrupt identification, and clearing the identity identification;

if the identification is the insert USB interrupt identification, executing Step B and Step C;

Step B, determining whether the smart key device communicates with the upper computer via the Bluetooth interface, if yes, clearing the insert USB interrupt identification, and executing Step C, if no, turning on USB channel enable, and clearing the insert USB interrupt identification and the identity identification, and executing Step C;

Step C, clearing the keypad waiting identification, displaying initialization on LCD;

when the interrupt identification is the Bluetooth connection/Bluetooth disconnection interrupt identification, executing corresponding operation of the Bluetooth channel, including: if the identification is the Bluetooth connection interrupt identification, executing Step D and Step E;

Step D, determining whether the smart key device communicates with the upper computer via the USB interface, if yes, turning off USB channel enable, turning on Bluetooth channel enable, and clearing the Bluetooth connection interrupt identification and the identity identification, and then executing Step E, if no, turning on Bluetooth channel enable, and clearing the Bluetooth connection interrupt identification, and executing Step E;

Step E, clearing the keypad waiting identification, displaying initialization on LCD;

if the identification is the Bluetooth disconnection interrupt identification, executing Step F;

Step F, determining whether the smart key device connects to the upper computer via the USB interface, if yes, turning off Bluetooth channel enable, turning on USB channel enable, and clearing the Bluetooth disconnection interrupt identification and the identity identification, if no, clearing the Bluetooth disconnection interrupt identification and clearing the identity identification;

in the method, when the instruction which does not need to perform an identity verification is the instruction for identity verification, the procedure of executing corresponding instruction operation according to the instruction, and returning corresponding instruction response to the upper computer including: when the instruction is the instruction for identity verification, clearing the identity identification, and then parsing the instruction for identity verification to get a verification information, and determining whether an user's identity is legal according to the verification information, if yes, saving the identity identification, and returning a response that the identity verification is successful to the upper computer according to the currently saved channel identification, if no, returning a response that the identity verification is not successful to the upper computer according to the currently saved channel identification;

after executing corresponding instruction operation according to the instruction, the procedure including: determining whether need a keypad operation, if yes, setting the keypad waiting identification, and then returning corresponding instruction response to the upper computer, if no, returning the corresponding instruction response to the upper computer directly;

when the identification is the keypad interrupt identification, the procedure also including: determining whether the keypad waiting identification is set, if yes, executing keypad processing and returning to Step S3, if no, returning to Step S3 directly.

The advantage of the present disclosure is that the working method of a smart key device, which is provided by the present disclosure, can resolve the issue of unification of interfaces of mobile devices, so as to make mobile payment more convenient and safer.

The smart key devices, which are made according to the present disclosure, can not only communicate with the data communication interfaces of computers, but also communicate with handhold devices.

BRIEF DESCRIPTION OF THE ACCOMPANYING DRAWINGS

FIG. 5 is a flowchart of a working method of a smart key device according to Embodiment 2;

FIG. 6 is a flowchart of a working method of a smart key device according to Embodiment 3.

DETAILED DESCRIPTION OF THE PRESENT INVENTION

The present disclosure is further described with the embodiments and the drawings below to make the objective, technical solution and advantages more clearly.

Embodiment 1

Figure 1:
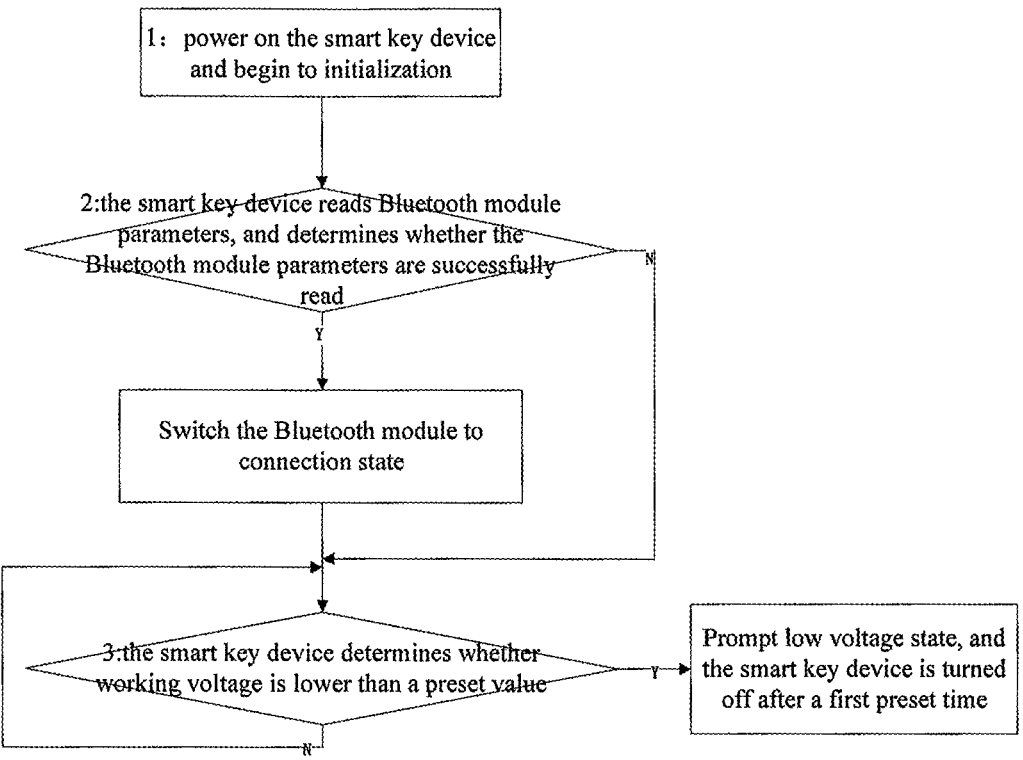
FIG. 1 is a flowchart of a working method of a smart key device according to Embodiment 1.

Embodiment 1 provides a working method of a smart key device which is not only applied in communication between a smart key device and a USB interface terminal, but also applied in communication between the smart key device and a Bluetooth terminal. As shown in FIG. 1, the method includes following steps:

Step 1, power on the smart key device and begin to initialization;

Specifically, there are two ways to power on the smart key device, including via a USB interface and via a battery. The process of powering on the smart key via a battery is controlled by a power key to realize turning on/off the device. Nevertheless, in the mode of powering on the device via the USB interface, the power key does not work anymore, and enter charge mode of the battery.

In Embodiment 1, preferably, a user can choose a channel for communication of the smart key device when turn on the device, in that case, after powering on the device to initialize and turn on interruption, the procedure includes: the smart key device prompts the user via LCD to choose a channel which can be I.USB communication or II. Bluetooth communication; the user can choose a channel via page up/down key and verify via the enter key, after receiving the user's verified information, the smart key device sets and saves a channel identification, and choose a communication channel according to the saved channel identification.

Figure 2:
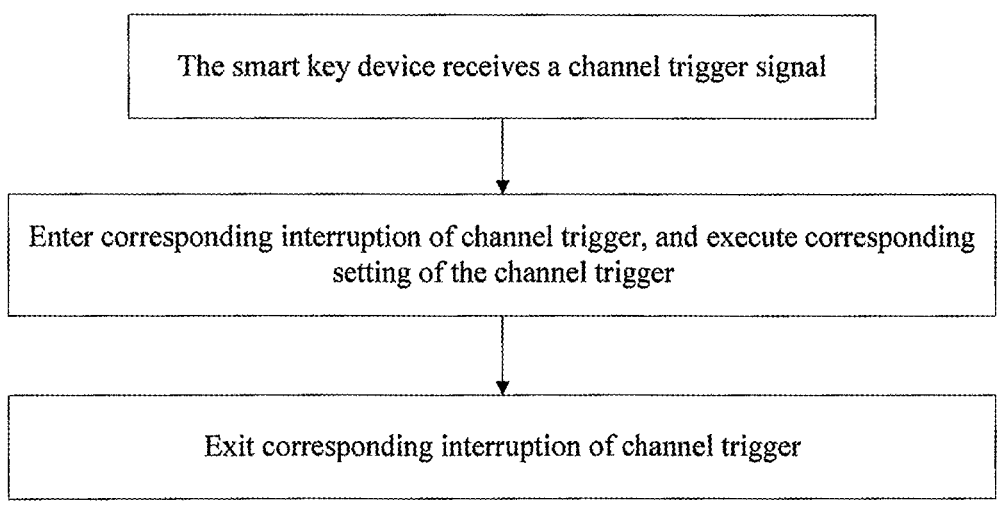
FIG. 2 is a processing flowchart of a smart key device receiving a channel trigger signal according to Embodiment 1.

Step 2, the smart key device reads Bluetooth module parameters, and determines whether the Bluetooth module parameters are read successfully, if yes, switch the Bluetooth module to connection state and execute Step 3, if no, execute Step 3 directly;

Step 3, the smart key device determines whether working voltage is lower than a preset value, if yes, prompt low-voltage state, and turn off the device after a preset time; if no, continue to execute Step 3;

As shown in FIG. 2, when the interrupt trigger signal which is received by the smart key device is a channel trigger signal, enter corresponding interruption of channel trigger, execute corresponding setting of channel trigger, and then exit corresponding interruption of channel trigger; and return to Step 3.

Preferably, the channel trigger signals include an insert USB trigger signal, a pull USB trigger signal, a Bluetooth connection signal and a Bluetooth disconnection signal.

Preferably, when entering insert USB interruption, the smart key device enters USB charge mode; when entering pull USB interruption, the smart key device exits USB charge mode.

Figure 3:
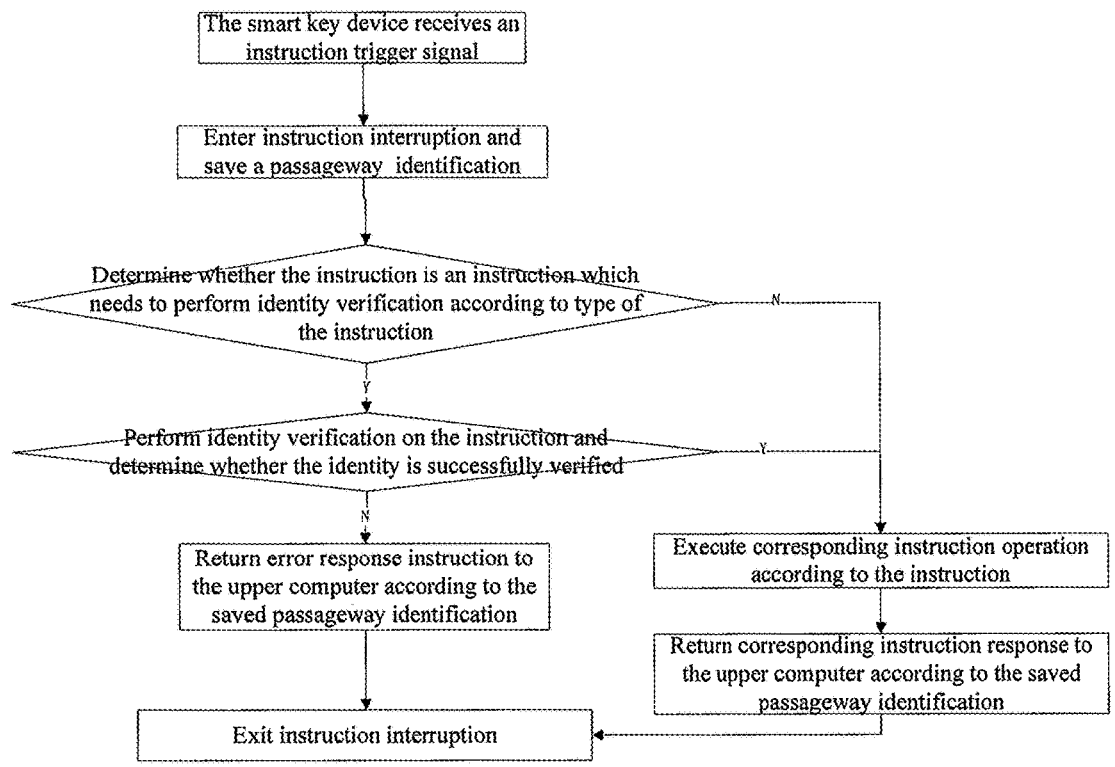
FIG. 3 is a processing flowchart of a smart key device receiving an instruction trigger signal according to Embodiment 1.
Figure 4:
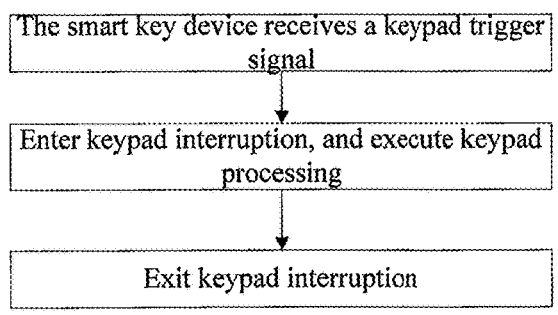
FIG. 4 is a processing flowchart of a smart key device receiving a key trigger signal according to Embodiment 1.

As shown in FIG. 3, when the interrupt trigger signal which is received by the smart key device is an instruction trigger signal, enter instruction interruption and execute instruction interruption operation, wherein the instruction trigger signals includes: an USB communication signal and a Bluetooth communication signal. The instruction interruption operation includes that save a channel identification, determine whether the instruction is an instruction which needs to perform identity verification according type of the instruction, if the received instruction is an instruction which needs to perform identity verification before executing instruction operations, perform the identity verification and determine whether the verification is successful, if yes, execute corresponding instruction operation according to the instruction and return corresponding instruction response to the upper computer according to the saved channel identification, and then exit instruction interruption; if the received instruction is an instruction which does not need to perform an identity verification before executing corresponding instruction operations, execute corresponding instruction operation according to the instruction and choose a channel to return corresponding instruction response to the upper computer and exit instruction interruption; and after exiting instruction interruption, return to step S3. Wherein the procedure of executing corresponding instruction operation according to the instruction includes that parse message data in the instruction to get key data, and perform Hash operation on the message data in the instruction to get and save the Hash result, and then display the key data on LCD (liquid crystal display), set the keypad waiting identification;

As shown in FIG. 4, when the interrupt trigger signal which is received by the smart key device is a keypad trigger signal, enter keypad interruption, and exit keypad interruption after keypad processing, and return to Step S3; wherein the keypad processing includes that determine type of the keypad, if the keypad is an enter keypad, make a signature for the saved Hash result to get a signature result and save it, if the keypad is a cancel key, cancel the signature.

When the interrupt trigger signal which is received by the smart key device is a timer trigger signal, enter timer interruption, and reset the timer, and set a dormancy identification to enter dormancy, when being waken up, exit timer interruption, and return to Step S3.

In Embodiment 1, specifically, timer interruption is triggered at a preset time which is reached through accumulated timing by the timer, namely, when the time of the timer reaches the preset time, enter timer interruption, reset the timer and set the dormancy identification to enter dormancy.

In the above method, the smart key device enters dormancy in timer interruption, preferably, the smart key device can also enter dormancy in the main circulation in Step 1-Step 3, including: when the interrupt trigger signal which is received by the smart key device is a timer trigger signal, enter timer interruption, and reset the timer, and set the dormancy identification, and exit timer interruption, and return to Step S3; wherein Step S3 also includes that determine whether the dormancy identification is set, if yes, enter dormancy, and execute Step S3 when being waken up; if no, continue to execute Step S3.

Before receiving the interrupt trigger signal, the smart key device turn on interruption.

Embodiment 2

On the basis of Embodiment 1, Embodiment 2 provides a communication method for a smart key device, and the method provides a specific method for how to choose a USB channel or a Bluetooth channel and how to realize switch between channels, as shown in FIG. 5, the Embodiment 2 includes following steps:

Step 101, power on a smart key device and begin to initialization;

Specifically, there are two ways to power on the smart key device, which are powering on the smart key device via an USB interface and powering on the smart key device via a battery. Wherein powering on the smart key via the battery is controlled by a power key to realize turning on/off the device. Nevertheless, in the mode of powering on the device via the USB interface, the power key does not work anymore, and enter charge mode of the battery at the same time.

Step 102, turn on interruption;

Step 103, the smart key device reads Bluetooth module parameters, and determines whether the Bluetooth module parameters are successfully read, if yes, execute Step 104; if no, execute Step 105;

In Embodiment 2, the Bluetooth module parameters include: MAC details, PIN code and name of the device; specifically, the smart key device reads the Bluetooth module parameters from a Bluetooth module, and determines whether the Bluetooth module parameters are successfully read according to the last byte of the Bluetooth module parameters, if the last byte is 0x01, the Bluetooth module parameters are successfully read by the smart key device, if it isn't 0x01, the Bluetooth module parameters are not successfully read.

Step 104, the smart key device switches the Bluetooth module to connection state;

In Embodiment 2, the process is closing state output pin of the Bluetooth module.

Step 105, the smart key device determines whether working voltage is lower than a preset value, if yes, prompt a low-voltage state, and turn off the device after a first preset time; if no, execute Step 106;

In Embodiment 2, state of low power can be displayed in LCD, via changing color of indicator, or it can be prompted via buzzing; the first preset time could be 20 seconds.

Step 106, continue to execute Step 105;

When the smart key device receives an interrupt trigger signal, execute Step 107;

Step 107, the smart key determines type of interruption according to a received interrupt trigger signal;

If there is a rule that perform USB interruption first when insert USB interruption and Bluetooth connection interruption are shown at the same time, correspondingly, execute different processing according to different interruption types, different processing are as follow:

When the smart key device receives a timer trigger waking up signal, enter timer interruption, and execute Step 108;

Step 108, reset the timer, and set a dormancy identification to enter dormancy, when the smart key device is waken up, exit timer interruption, and return to Step 105;

Specifically, when the timer reaches a preset dormancy time, the smart key device receives the wake up signal triggered by the timer, enter timer interruption, and then reset the timer, and set the dormancy identification to enter dormancy, when the smart key device is waken up, exit timer interruption, and return to execute Step 105.

In Embodiment 2, the procedure could also include that when the interrupt trigger signal which is received by the smart key device is a timer trigger signal, enter timer interruption, reset the timer, and set the dormancy identification, and exit timer interruption, and return to Step 105; Step 105 includes that determine whether the dormancy identification is set, if yes, enter dormancy, when being waken up, continue to execute Step 105; if no, continue to execute Step 105.

When the smart key device receives an insert USB trigger wake up signal, enter insert USB interruption, the smart key device enters USB charge mode, and execute Step 109;

Step 109, determine whether the dormancy identification is set, if yes, execute Step 110; if no, execute Step 111;

Step 110, reset the dormancy identification, turn on USB channel enable, clear the identity identification, and execute Step 112;

Step 111, turn on USB channel enable, turn off Bluetooth channel enable, and clear the identity identification;

Step 112, clear the keypad waiting identification, initialization is displayed on LCD, exit insert USB interruption, return to Step 105;

Preferably, the step can further include that the smart key device prompts on LCD that the current communication mode is a USB communication.

When the smart key device receives a pull USB trigger signal, enter pull USB interruption, the smart key exits USB charge mode, and execute Step 113;

Step 113, turn off USB channel enable, turn on Bluetooth channel enable, clear identity identification, exit pull USB interruption; and return to Step 105;

When the smart key device receives a Bluetooth connection signal, enter Bluetooth connection interruption, and exit Step 114;

Step 114, determine whether the dormancy identification is set, if yes, execute Step 115; if no, execute Step 116;

Step 115, reset the dormancy identification, turn on Bluetooth channel enable, clear identity identification, and execute Step 118;

Step 116, determine whether the smart key device connects to an upper computer via a USB interface, if yes, execute Step 117; if no, turn on Bluetooth channel enable, clear the identity identification, and execute Step 118;

Step 117, turn off Bluetooth channel enable;

Step 118, clear the keypad waiting identification, initialization is displayed on LCD, exit Bluetooth connection interruption; return to Step 105;

Preferably, the process can further include: the smart key device prompts on LCD that the current communication mode is Bluetooth communication.

In Embodiment 2, preferably, when the smart key device receives the Bluetooth connection signal, the process of entering Bluetooth connection interruption further includes match process between the smart key device and a terminal which is used for sending the Bluetooth connection signal, wherein the terminal is a host device, such as PC computer, mobile phone, or PAD.

Specifically, the match process includes: the smart key device receives a Bluetooth connection signal sent by the host device, and displays name or ID of the host device on LCD, and waits for a user to choose the host device which is being connected; when receiving the choice acknowledgement sent by the user, the smart key device sends request for verifying PIN code, the smart key device receives the PIN code sent by the host device and compares it with PIN code stored in the smart key device, if the PIN codes match, connect to the host device, and continue to execute Step 114, if the PIN codes do not match, the smart key device displays connection fails on LCD, clear the keypad waiting identification, and exit Bluetooth connection interruption.

When the smart key device receives a Bluetooth disconnection signal, enter Bluetooth disconnection interruption, and execute Step 119;

Step 119, set the dormancy identification, turn off Bluetooth channel enable, clear the identity identification, and then exit Bluetooth disconnection interruption; and then return to Step 105;

When the smart key device receives a USB communication signal or a Bluetooth communication signal, enter instruction interruption, and execute Step 120;

Step 120, save a channel identification, determine type of the instruction, when the instruction is a verification instruction, execute Step 121, when the instruction is another instruction, execute Step 124;

In Embodiment 2, specifically, if the smart key device receives the USB communication signal, set the channel identification as 1, if the mart key device receives the Bluetooth communication signal, set the channel identification as 2.

In Embodiment 2, specifically, determine type of the instruction according to the first four bytes of the instruction; determine whether the first four bytes are the first preset value, if yes, the instruction is a verification instruction; if no, the instruction is another instruction; preferably, the first preset value is 00 20 0B 11.

Other instructions include an instruction for setting algorithm and information of the key, an instruction for Hashing message data, an instruction for calculating signature, an instruction for obtaining keypad information, and an instruction for obtaining signature result.

Preferably, if the first four bytes of the instruction is 00 22 41 B6, the instruction is an instruction for setting algorithm and information of the key;

if the first four bytes of the instruction is 11 2A 90 80, the instruction is an instruction for hashing message data;

if the first four bytes of the instruction is 00 2A 9E 00, the instruction is an instruction for calculating signature;

if the first four bytes of the instruction is 80 E5 00 00, the instruction is an instruction for obtaining key information;

if the first four bytes of the instruction is 80 E3 00 00, the instruction is an instruction for obtaining signature result;

Step 121, verification information is parsed from the instruction; Specifically, in Embodiment 2, the verification information could be a cryptogram preset by the user, or a string of random numbers, or serial number of the device, etc.

Step 122, determine whether the user's identity is legal according to the verification information, if yes, execute Step 123, if no, execute Step 129;

Specifically, the smart key device determines whether the verification information matches the information which is stored in or generated by the smart key device, if yes, the user's identity is legal; if no, the user's identity is illegal. The verification information may be a combination of letters, data or other characters.

Preferably, the process of verifying the user's identity in Step 121 and Step 122 can also include that the smart key device prompts to enter biological feature information via LCD, and receives biological feature information entered by the user via a build-in biological feature sensor, and determines whether the biological feature information matches the pre-stored information, if yes, the user's identity is legal; if no, the user's identity is illegal. The biological feature information includes fingerprint, palm print or iris, etc.

Step 123, save the identity identification, and execute Step 129;

Step 124, determine whether the instruction is an instruction which need to perform identity verification, if yes, execute Step 125; if no, execute Step 126;

For instance, a part of read instructions are the instructions which do not need to perform identity verification.

Step 125, determine whether the smart key device can obtain an identity identification, if yes, execute Step 126; if no, execute Step 129;

Step 126, execute corresponding instruction operation;

Specifically, the process includes: when the instruction received by the smart key device is an instruction for setting algorithm and signature information, execute A; when the instruction received by the smart key device is an instruction for hashing message data, execute B; when the instruction received by the smart key device is an instruction for calculating signature, execute C; when the instruction received by the smart key device is an instruction for obtaining key information, execute D; when the instruction received by the smart key device is an instruction for obtaining signature result, execute E;

A, set signature algorithm and hash algorithm, and obtain the user's private key from files of the key and store the private key into a memory; specifically, obtain corresponding user's private key according to key ID and purpose information in the instruction for setting algorithm and signature information and store the private key into the memory;

B, parse the message data in the instruction to get the key data and store the data into a display buffer, and perform Hash operation on the message data in the instruction to get Hash result and store the result;

C, display the key data in the display buffer on LCD, set the keypad waiting identification;

D, execute operation of obtaining keypad information, and save the information;

E, execute operation of obtaining signature result, and save the signature result.

The method in Step 126 of the Embodiment need to display all key information which should be confirmed by the user, and then the user can sign, the method avoid the risk that the user cannot easily find that the trade message is replaced; and the method avoid from being tricked into signing by hacker, so as to enhance security of signature.

In Embodiment 2, the above corresponding operations of A, B and C can also be realized via two instructions, that is in Step 126, when the received instruction is an instruction for setting algorithm and signature information, execute A; when the received instruction is an instruction for message data hash and signature, execute B and C in sequence.

In Embodiment 2, the above corresponding operations of A, B and C can be realized via one instruction, in Step 126, when the received instruction is an instruction for setting parse signature, execute A, B and C in sequence.

Step 127, determine whether need to wait keypad operation, if yes, execute Step 128, if no, execute Step 129;

In Embodiment 2, when the received instruction is an instruction for calculating signature, need to wait keypad operation.

Step 128, set the keypad waiting identification;

Step 129, determine the channel identification, if the channel identification is 1, execute Step 130; if the channel identification is 2, execute Step 131;

Step 130, return corresponding instruction response to the upper computer via the USB channel, exit instruction interruption, and return to Step 105;

Step 131, return corresponding instruction response to the upper computer via the Bluetooth channel, exit instruction interruption, and return to Step 105.

Preferably, execute the instruction for calculating signature, and then exit instruction interruption, after that, if the wait keypad is overtime, clear keypad waiting identification, and initialization is displayed on LCD, and prompt that keypad is overtime.

When the smart key device receives a keypad signal, enter keypad interruption, and execute Step 132;

Step 132, determine whether the keypad waiting identification is set, if yes, execute Step 133; if no, exit keypad interruption, and return to Step 105;

Step 133, determine type of the keypad, if the keypad is a page up/page down keypad, execute Step 134, if the keypad is an enter keypad, execute Step 135, if the keypad is a canceling keypad, execute Step 136;

Step 134, display key information on LCD via page up/page down, then exit key interruption, and return to Step 105;

Preferably, when finish outputting all key information and displaying them, the procedure further includes set a mark for finishing displaying message as valid.

Step 135, determine whether the mark for finishing displaying message is valid, if the mark is valid, use the user's private key to sign the saved hash result, and determine the signature is successfully signed, if yes, display on LCD that the operation is successful, and save the signature result, and execute Step 137; if no, display on LCD that the operation fails, and execute Step 137; if the mark is invalid, prompt on LCD the operation fails, and execute Step 137;

Step 136, display on LCD that operation is canceled, and execute Step 137;

Step 137, clear keypad waiting identification; exit keypad interruption, and return to Step 105.

If there is a rule that Bluetooth connection interruption is processed first when USB interruption and Bluetooth connection interruption appear at the same time, in that way, compare with the above steps of processing insert USB interruption firstly, only interruption processing in following interruption is different, including:

When the smart key device receives the insert USB trigger signal, enter insert USB interruption, and execute Step 109';

Step 109', determine whether the dormancy identification is set, if yes, execute Step 110', if no, execute Step 111';

Step 110', set the dormancy identification, turn on USB channel enable, clear the identity identification, and execute Step 112';

Step 111', determine whether the smart key device connects to the upper computer via a Bluetooth interface, if yes, turn off USB channel enable, execute Step 112'; if no, turn on USB channel enable, clear identity identification, and execute Step 112';

Step 112', clear the keypad waiting identification, display initialization on LCD; exit insert USB interruption; and return to Step 105;

When the smart key device receives the pull USB trigger signal, enter pull USB interruption, and execute Step 113';

Step 113', determine whether the smart key device connects with the upper computer via a Bluetooth interface, if yes, exit pull USB interruption, and return to Step 105; if no, set the dormancy identification, turn off USB channel enable, clear the identity identification, exit pull USB interruption, and return to Step 105.

When the smart key device receives the Bluetooth connection signal, enter Bluetooth connection interruption, and execute Step 114';

Step 114', determine whether the dormancy identification is set, if yes, execute Step 115', if no, execute Step 116';

Step 115', set the dormancy identification, turn on Bluetooth channel enable, clear the identity identification, and execute Step 117';

Step 116', turn off USB channel enable, turn on Bluetooth channel enable, and clear the identity identification;

Step 117', clear the keypad waiting identification, display initialization on LCD; exit Bluetooth connection interruption; and return to Step 105;

Preferably, the procedure can also include that the smart key device prompts on LCD that the current communication mode is Bluetooth communication.

In Embodiment 2, preferably, when the smart key receives the Bluetooth connection signal, the procedure of entering Bluetooth connection interruption further includes the match process between the smart key device and the terminal which is used for sending the Bluetooth connection signal, wherein the terminal which sends the Bluetooth connection signal to the smart key device is a host device such as PC computer, mobile phone and PAD.

Specifically, the match process is that the smart key device receives the Bluetooth connection signal sent by the host device, and displays name and ID of the host device, and waits for a user to choose the host device which is being connected; when receiving the choice acknowledgement send by the user, the smart key device sends request for verifying PIN code, the smart key device receives the PIN code send by the host device and compares it with PIN code stored in the smart key device, if the PIN codes match, connect to the host device, and continue to execute Step 114', if the PIN codes do not match, the smart key device displays on LCD that connection fails, clears the keypad waiting identification, and exits Bluetooth connection interruption.

When the smart key device receives the Bluetooth disconnection signal, enter Bluetooth disconnection interruption, and execute Step 118';

Step 118', determine whether the smart key device connects to the upper computer via a USB interface, if yes, turn off Bluetooth channel enable, turn on USB channel enable, clear the identity identification, exit Bluetooth disconnection interruption, and return to Step 105; if no, turn off the Bluetooth channel, clear the identity identification, set the dormancy identification, exit Bluetooth disconnection interruption, and return to Step 105.

Or, enter instruction interruption according to the rule of first come first served, among the USB channel and the Bluetooth channel, the one which receives instruction first processes the instruction firstly, specifically, when the smart key device receives the USB communication signal or the Bluetooth communication signal, enter instruction interruption, and in Step 120, if the USB communication signal is received, the smart key device sets the channel identification as 1, and turn off Bluetooth channel enable;

if the Bluetooth communication signal is received, the smart key device sets the channel identification as 2, and turn off USB channel enable.

Or, realize switch between the USB channel and the Bluetooth channel via an instruction for switching channel;

Correspondingly, if the instruction received by the smart key device is an instruction for switching channel, enter instruction interruption, in Step 126, corresponding instruction operations are executed as follow:

Compare a appointed channel identification in the instruction for switching channel with a current channel identification, if the identifications are same, execute Step 127 directly; if they are different, before Step 127, the procedure further includes: when the appointed channel identification is 1 that means the channel is the USB channel, turn off Bluetooth channel enable, turn on USB channel enable, the smart key device prompts on LCD that the communication mode switches from Bluetooth communication to USB communication, and clears keypad waiting identification. When the channel identification is 2 that means the channel is the Bluetooth channel identification, turn off USB channel enable, and turn on Bluetooth channel enable. And the smart key device prompts on LCD that the communication mode switches from USB communication to Bluetooth communication. And clear keypad waiting identification.

In Embodiment 2, preferably, the communication channel can be chosen by the user when the smart key device is powered on, in that way, after powering on the smart key device and turning on interruption, the smart key device prompts the user on LCD to choose a channel which may be USB channel or Bluetooth channel; the user can choose a channel via a page on/down keypad, and verify via an enter keypad, after receiving the user's verifying information, the smart key device sets and saved the channel identification, and then use the set and saved channel for communication during the following communication. Correspondingly, when determine the interruption type is insert USB interruption or Bluetooth connection interruption, the procedure also includes determining whether the interruption type matches the currently saved channel identification, if yes, execute Step 109 and Step 114 in Embodiment 2; if no, exit interruption directly.

Embodiment 3

On the basis of Embodiment 1, Embodiment 3 provides a working method of a smart key device, and the method provides a specific method for how to choose an USB channel or a Bluetooth channel and how to realize switch between channels, as shown in FIG. 6, Embodiment 3 includes following steps:

Step 201, power on a smart key device and begin to initialization;

Specifically, there are two ways to power on the smart key device, which are powering on the smart key device via an USB interface and powering on the smart key device via a battery. Wherein powering on the smart key via a battery is controlled by a power key to realize to turn on/off the device. Nevertheless, in the mode of powering on the device via the USB interface, the power key does not work anymore, and enter charge mode of the battery at the same time.

Step 202, turn on interruption;

Step 203, the smart key device reads Bluetooth module parameters, and determines whether the Bluetooth module parameters are successfully read, if yes, execute Step 204; if no, execute Step 205;

In Embodiment 3, the Bluetooth module parameters include: MAC details, PIN code and name of the device; specifically, the smart key device reads the Bluetooth module parameters from a Bluetooth module, and determines whether the Bluetooth module parameters are successfully read according to the last byte of the Bluetooth module parameters, if the last byte is 0x01, the Bluetooth module parameters are successfully read, if it isn't 0x01, the Bluetooth module parameters are not successfully read by the smart key device.

Step 204, the smart key device switches the Bluetooth module to connection state;

In Embodiment 3, the step is turning off state output pin of the Bluetooth module.

Step 205, the smart key device determines whether working voltage is lower than a preset value, if yes, prompt low-voltage state, and turn off the device after a first preset time; if no, execute Step 206;

In Embodiment 3, state of low power can be displayed on LCD, the state can also be displayed via changing color of indicator, or it can also be prompted via buzzing; the first preset time could be 20 seconds.

Step 206, the smart key device determines whether an interrupt identification exits, if the interrupt identification exits, execute the next step, if the interrupt identification dose not exit, continue to execute Step 206;

Between Step 202 and Step 206, the procedure includes:

When the smart key device receives an insert/pull USB trigger signal, enter insert/pull USB interruption, and save an insert/pull USB interrupt identification, and then exit insert/pull USB interruption;

When the smart key device receives a Bluetooth connection signal/Bluetooth disconnection signal, enter Bluetooth connection interruption/Bluetooth disconnection interruption, and save a Bluetooth connection interrupt identification/Bluetooth disconnection interrupt identification, and then exit Bluetooth connection interruption/Bluetooth disconnection interruption;

When the smart key device receives a USB communication signal or a Bluetooth communication signal, enter instruction interruption, and save an instruction interrupt identification, and save a channel identification, and then exit instruction interruption;

When the smart key device receives a timer trigger, enter timer interruption, save a timer interrupt identification, and then exit timer interruption;

When the smart key device receives a key signal, enter key interruption, and save a key interrupt identification, and then exit key interruption.

Step 207, the smart key device determines type of the interrupt identification;

If there is a rule that insert USB interruption is processed first when insert USB interruption and Bluetooth connection interruption appear at the same time, correspondingly, according to different types of interrupt identifications, interruption processing are executed as follow:

If the interrupt identification is the pull USB interrupt identification, execute Step 208;

Step 208, turn off USB channel enable, turn on Bluetooth channel enable, and clear the pull USB interrupt identification and the identity identification, and return to Step 205;

If the interrupt identification is the insert USB interrupt identification, execute Step 209;

Step 209, determine whether the smart key device connects to an upper computer via a Bluetooth interface, if yes, execute Step 210; if no, execute Step 211;

Step 210, turn off Bluetooth channel enable, turn on USB channel enable, and clear the insert USB interrupt identification and the identity identification; and execute Step 215;

Step 211, turn on USB channel enable, clear the insert USB interrupt identification; and execute Step 215;

If the interrupt identification is the Bluetooth connection interrupt identification, execute Step 212;

Step 212, determine whether the smart key device connects to the upper computer via an USB interface, if yes, execute Step 213, if no, execute Step 214;

Step 213, clear the Bluetooth connection interrupt identification, and execute Step 215;

Step 214, turn on Bluetooth channel enable, and clear Bluetooth connection interrupt identification and the identity identification; and execute Step 215;

Step 215, clear a keypad waiting identification, and initialization is displayed on LCD; and return to Step 205;

If the interrupt identification is the Bluetooth disconnection interrupt identification, execute Step 216;

Step 216, determine whether the smart key device connects to the upper computer via the USB interface, if yes, turn off Bluetooth channel enable, and turn on USB channel enable, and clear the Bluetooth disconnection interrupt identification and the identity identification, and return to Step 205; if no, clear the Bluetooth disconnection interrupt identification and the identity identification, and return to Step 205;

If the interrupt identification is the timer interrupt identification, execute Step 217;

Step 217, reset the timer, and clear the timer interrupt identification, and return to Step 205;

If the interrupt identification is the instruction interrupt identification, execute Step 218.

Step 218, determine type of an instruction; when the instruction is an instruction for identity verification, execute Step 219, when the instruction isn't an identity verification, execute Step 222;

In Embodiment 3, specifically, if the USB communication signal is received, set the channel identification as 1, if the Bluetooth communication signal is received, set the channel identification as 2.

In Embodiment 3, specifically, determine type of the instruction according to the first four bytes of the instruction; determine whether the first four bytes of the instruction is a first preset value, if yes, the instruction is an instruction for identity verification, if no, the instruction is another instruction; preferably, the first preset value is 00 20 0B 11.

The other instructions include: an instruction for setting algorithm and information of the key, an instruction for Hashing message data, an instruction for calculating signature, an instruction for obtaining keypad information, and an instruction for obtaining signature result.

Preferably, if the first four bytes of the instruction is 00 22 41 B6, the instruction is an instruction for setting algorithm and information of the key;

if the first four bytes of the instruction is 11 2A 90 80, the instruction is an instruction for hashing message data;

if the first four bytes of the instruction is 00 2A 9E 00, the instruction is an instruction for calculating signature;

if the first four bytes of the instruction is 80 E5 00 00, the instruction is an instruction for obtaining keypad information;

if the first four bytes of the instruction is 80 E3 00 00, the instruction is an instruction for obtaining signature result;

Step 219, verification information is parsed form the instruction;

In Embodiment 3, specifically, the verification information could be a cryptogram preset by the user, or a string of random numbers, or serial number of the device, etc.

Step 220, determine whether the user's identity is legal according to the verification information, if yes, execute Step 221, if no, execute Step 227;

Specifically, the smart key device determines whether the verification information matches the information which is stored in or generated by the smart key device, if yes, the user's identity is legal; if no, the user's identity is illegal. The verification information may be a combination of letters, data or other characters.

Preferably, the process of verifying the user's identity in Step 219 and Step 220 can also include that the smart key device prompts to enter biological feature information via LCD, and receives biological feature information entered by the user via a build-in biological feature sensor, and determines whether the biological feature information matches the pre-stored information, if yes, the user's identity is legal; if no, the user's identity is illegal.

Step 221, save the identity identification, and execute Step 227;

Step 222, determine whether the instruction is an instruction which need to perform identity verification, if yes, execute Step 223; if no, execute Step 224;

For instance, a part of the read instruction is the instruction which does not need to perform identity verification.

Step 223, determine whether the smart key device can obtain an identity identification, if yes, execute Step 224; if no, execute Step 227;

Step 224, execute corresponding instruction operation; Specifically, the step includes:

when the instruction received by the smart key device is the instruction for setting algorithm and signature information, the instruction operation is that set signature algorithm, hash algorithm and information of the key;

when the instruction received by the smart key device is the instruction for hashing message data, the instruction operation is that message data in the instruction is parsed to get and store key data, perform hash operation on the message data in the instruction to get and store hash result;

when the instruction received by the smart key device is the instruction for calculating signature, the instruction operation is that display the key data on LCD, and set the keypad waiting identification;

when the instruction received by the smart key device is the instruction for obtaining keypad information, the instruction operation is that execute operation of obtaining keypad information and store the obtained keypad information;

when the instruction received by the smart key device is an instruction for obtaining signature result, execute operation of obtaining signature result, and store the signature result.

Step 225, determine whether need to wait for keypad operation, if yes, execute Step 226, if no, execute Step 227;

Step 226, set the keypad waiting identification, and wait for key interruption;

Step 227, determine the channel identification, when it is 1, execute Step 228, when the identification is 2, execute Step 229;

Step 228, return corresponding instruction response to the upper computer via the USB channel, exit instruction interruption, and return to Step 205;

Step 229, return corresponding instruction response to the upper computer via the Bluetooth channel, exit instruction interruption, and return to Step 205.

If the interrupt identification is the keypad interrupt identification, execute Step 230.

Step 230, determine whether the keypad waiting identification is set, if yes, execute Step 231, if no, return to Step 205;

Step 231, determine type of the keypad, if the keypad is a page up/down key, execute Step 232, if the keypad is an enter key, execute Step 233, if the keypad is a cancel key, execute Step 234;

Step 232, display the key information on LCD via the page up/down key, exit keypad interruption, return to Step 205; preferably, when export and display all key information, set the mark for finishing displaying message as valid.

Step 233, determine whether the mark for finishing displaying message is valid, if it is valid, use the user's private key to sign on the hash result, then determine whether signature is successful, if the signature is successful, operation successes is displayed on LCD, and the signature result is stored, and execute Step 235, if the signature fails, that operation fails is displayed on LCD, and execute Step 235; if the mark for finishing displaying message is not valid, that operation fails is displayed on LCD, and execute Step 235;

Step 234, operation canceled is displayed on LCD, and execute Step 235;

Step 235, clear the keypad waiting identification, and return to Step 205.

If there is a rule that Bluetooth connection interruption is performed first when USB interruption and Bluetooth connection interruption appear at the same time, in that way, compare with the above step of processing insert USB interruption first, only interruption processing in following interruption is different, including:

If the interrupt identification is the insert USB interrupt identification, execute Step 209';

Step 209', determine whether the smart key device connects to the upper computer via the Bluetooth interface, if yes, execute Step 210', if no, execute Step 211';

Step 210', clear the USB connection interrupt identification, and then execute Step 215;

Step 211', turn on USB channel enable, and clear the insert USB interrupt identification and the identity identification, and then execute Step 215;

If the interrupt identification is the pull USB interrupt identification, execute Step 208';

Step 208', turn off USB channel enable, turn on Bluetooth channel enable, clear the pull USB interrupt identification and the identity identification, and then return to Step 205;

If the interrupt identification is the Bluetooth connection interrupt identification, execute Step 212';

Step 212', determine whether the smart key device connects to the upper computer via the USB interface, if yes, execute Step 213'; if no, execute Step 214';

Step 213', turn off USB channel enable, turn on Bluetooth channel enable, and clear the Bluetooth connection interrupt identification and the identity identification, and then execute Step 215;

Step 214', turn on Bluetooth channel enable, clear the Bluetooth connection interrupt identification, and execute Step 215;

If the interrupt identification is the Bluetooth disconnection interrupt identification, execute 216';

Step 216', turn off Bluetooth channel enable, turn on USB channel enable, clear the Bluetooth disconnection interrupt identification and the identity identification; and return to Step 205.

Or, enter instruction interruption according to the rule of first come first served, among the USB channel and the Bluetooth channel, the one which receives instruction first processes the instruction firstly, specifically, when the smart key device receives the USB communication signal or the Bluetooth communication signal, enter instruction interruption, and in Step 218, if the USB communication signal is received, the smart key device sets the channel identification as 1, and turn off Bluetooth channel enable;

if the Bluetooth communication signal is received, the smart key device sets the channel identification as 2, and turn off USB channel enable.

Or, realize switch between the USB channel and the Bluetooth channel via an instruction for switching channel;

if the instruction received by the smart key device is the instruction for switching channel in Step 218, corresponding instruction operations in Step 224 are executed as follow:

Compare an appointed channel identification in the instruction for switching channel with a current channel identification, if the identifications are same, execute Step 225 directly; if they are different, before Step 225, the procedure also includes: when the appointed channel identification is 1 which means the USB channel, turn off Bluetooth channel enable, turn on USB channel enable, the smart key device prompts on LCD that the communication mode is switched from Bluetooth communication to USB communication, and clear keypad waiting identification. When the appointed channel identification is 2 which means the Bluetooth channel, turn off USB channel enable, turn on Bluetooth channel enable, and the smart key device prompts on LCD that the communication mode is switched from USB communication to Bluetooth communication, and clear the keypad waiting identification.

In Embodiment 3, preferably, the communication channel can be chosen by the user when the smart key device is powered on, in that way, after powering on the smart key device and turning on interruption, the smart key device prompts the user on LCD to choose a channel which may be USB channel or Bluetooth channel; the user can choose a channel via a page on/down key, and verify via an enter key, after receiving the user's verifying information, the smart key device sets and saves the channel identification, and then use the set and saved channel for communication during the following communication. Correspondingly, when determine whether the interruption type is insert USB interruption or Bluetooth connection interruption, the procedure also includes determining whether the interruption type matches the currently saved channel identification, if yes, execute Step 209 and Step 212 in Embodiment 3; if no, return to Step 205.

The above embodiments are preferably embodiments of the present disclosure, changes and substitutions provided by those skilled in the art belong to protective scope as defined in Claims of the present disclosure.

The invention claimed is:

1. A working method of a smart key device, characterized in that said method comprises the steps of:
Step S1, powering on the smart key device so as to start initialization;
Step S2, reading, by the smart key device, Bluetooth module parameters, determining whether the Bluetooth module parameters are successfully read, if yes, switching the Bluetooth module to a connection state and executing S3, otherwise executing step S3;
Step S3, determining, by the smart key device, whether a working voltage of the smart key device is lower than a preset value, if yes, prompting low voltage state and turning off the smart key device after a first preset time; otherwise, continuing to execute Step S3;
when an interrupt trigger signal which is received by the smart key device is a channel trigger signal, entering corresponding interruption of a channel trigger, and exiting the corresponding interruption of the channel trigger after executing corresponding setting of the channel trigger, and returning to Step S3;
when the interrupt trigger signal which is received by the smart key device is an instruction trigger signal, entering an instruction interruption, saving a channel identification, and determining an instruction type, if the received instruction is an instruction that needs to perform identity verification before executing an instruction operation, performing identity verification on the instruction, if the identity is successfully verified, after executing corresponding instruction operation according to the instruction and returning the corresponding instruction response to an upper computer, exiting instruction interruption, and returning to Step S3; if the identity is not successfully verified, after returning an error instruction response to the upper computer, exiting instruction interruption, and returning to Step S3; if the received instruction is an instruction that does not need to perform identity verification before executing instructions operation, executing corresponding instruction operation according to the instruction and returning corresponding instruction response to the upper computer, then exiting the instruction interruption, and returning to Step S3; the process of executing corresponding instruction operation according to the instruction comprising: parsing message data in the instruction to get key data, and performing Hash operation on the message data in the instruction to get and save a Hash result, and then displaying the key data on a liquid crystal display (LCD);
when the interrupt trigger signal which is received by the smart key device is a keypad trigger signal, entering keypad interruption, and exiting keypad interruption after keypad processing, and returning to Step S3; the keypad processing comprising: determining type of the keypad, if the keypad is an enter keypad, signing the saved Hash result to get a signature result and save the signature result, if the keypad is a canceling keypad, then canceling the signature result.

2. The working method of claim 1, wherein said method further comprises: when the interrupt trigger signal which is received by the smart key device is a timer trigger signal, entering timer interruption, resetting the timer, setting a dormancy identification, and entering dormancy, when being waken up, exiting the timer interruption, and returning to Step S3, or
when the interrupt trigger signal which is received by the smart key device is a timer trigger signal, entering timer interruption, resetting the timer, setting the dormancy identification, and exiting timer interruption, and returning to Step S3;
said Step S3 further comprising: determining whether the dormancy identification is set, if yes, entering dormancy, and continuing to execute Step S3 when being waken up; if no, continuing to execute Step S3.

3. The working method of claim 1, wherein the channel trigger signals comprise: an insert universal serial bus (USB), trigger signal, a pull USB trigger signal, a Bluetooth connection signal and a Bluetooth disconnection signal; and wherein the instruction trigger signals comprise: an USB communication signal and a Bluetooth communication signal;
when the interrupt trigger signal which is received by the smart key device is the insert USB trigger signal belonging in the channel trigger signals, entering an insert USB interruption, and executing Step A and Step B as follows:
Step A, determining whether the dormancy identification is set, if yes, resetting the dormancy identification, and turning on USB channel enable, and clearing an identity identification, and executing Step B; if no, turning on USB channel enable, turning off Bluetooth channel enable, clearing the identity identification, and executing Step B;
Step B, clearing a keypad waiting identification, displaying initialization on LCD, and then exiting the insert USB interruption;
when the interrupt trigger signal which is received by the smart key device is the pull USB trigger signal belonging in the channel trigger signals, entering pull USB interruption, and executing the following Step C;
Step C, turning off USB channel enable, turning on Bluetooth channel enable, and clearing the identity identification, and exiting pull USB interruption;
when the interrupt trigger signal which is received by the smart key is the Bluetooth connection signal belonging in the channel trigger signals, entering Bluetooth connection interruption, and executing the following Step D and Step E:
Step D, determining whether the dormancy identification is set, if yes, resetting the dormancy identification, turning on Bluetooth channel enable, clearing the identity identification, and executing Step E; otherwise, determining whether the smart key device connects to an upper computer via a USB interface, if yes, turning off Bluetooth channel enable, and executing Step E, if no, turning on Bluetooth channel enable, clearing the identity identification, and executing Step E;
Step E, clearing the keypad waiting identification, displaying initialization on LCD, and exiting Bluetooth connection interruption;
when the interrupt trigger signal which is received by the smart key device is the Bluetooth disconnection signal belonging in the channel trigger signals, entering Bluetooth disconnection interruption, and executing the following Step F:

Step F, setting the dormancy identification, turning off Bluetooth channel enable, clearing the identity identification, and then exiting Bluetooth disconnection interruption;

when the instruction which does not need to perform identity verification is an instruction for identity verification, the procedure of executing corresponding instruction operation according to the instruction and returning corresponding instruction response to the upper computer comprising: clearing the identity identification at first, then parsing the instruction for identity verification to get verification information, and determining whether the identity of the user is legal according to the verification information, if yes, saving the identity identification, and returning a response that the identity is successfully verified to the upper computer according to a currently saved channel identification, if no, returning a response that the identity is not successfully verified to the upper computer according to the currently saved channel identification;

after executing corresponding instruction operation according to the instruction, the method further comprises: determining whether needs to wait for keypad operation, if yes, setting a keypad waiting identification, and then returning corresponding instruction response to the upper computer; if no, returning corresponding instruction response to the upper computer directly; and after entering keypad interruption, the method further comprises: determining whether the keypad waiting identification is set, if yes, executing keypad processing, and then exiting keypad interruption; if no, exiting keypad interruption directly.

4. The method of claim 1, wherein the channel switch signals comprise: an insert universal serial bus (USB) trigger signal, a pull USB trigger signal, a Bluetooth connection signal and a Bluetooth disconnection signal; the instruction trigger signals comprise a USB communication signal and a Bluetooth communication signal;

when the interrupt trigger signal which is received by the smart key device is the insert USB trigger signal belonging in the channel trigger signals, entering insert USB interruption, and executing the following Step A and Step B:

Step A, determining whether the dormancy identification is set, if yes, resetting the dormancy identification, turning on USB channel enable, clearing the identity identification, and executing Step B; if the dormancy identification is not set, determining whether the smart key device connects to the upper computer via a Bluetooth interface, if yes, turning off USB channel enable, and executing Step B; if no, turning on USB channel enable, clearing the identity identification, and executing Step B;

Step B, clearing the keypad waiting identification, displaying initialization on LCD, and exiting insert USB interruption;

when the interrupt trigger signal which is received by the smart key device is the pull USB trigger signal belonging in the channel trigger signals, entering pull USB interruption, and executing the following Step C:

Step C, determining whether the smart key device connects to the upper computer via the Bluetooth interface, if yes, exiting pull USB interruption; if no, setting the dormancy identification, turning off USB channel enable, clearing the identity identification, and exiting pull USB interruption;

when the interrupt trigger signal which is received by the smart key device is the Bluetooth connection signal belonging in the channel trigger signals, entering Bluetooth connection interruption, and executing the following Step D and Step E:

Step D, determining whether the dormancy identification is set, if yes, resetting the dormancy identification, turning on Bluetooth channel enable, clearing the identity identification, and executing the following Step E; if no, turning off USB channel enable, turning on Bluetooth channel enable, clearing the identity identification, and then executing the following Step E:

Step E, clearing the keypad waiting identification, displaying initialization on LCD, exiting Bluetooth connection interruption;

when the interrupt trigger signal which is received by the smart key device is the Bluetooth interruption signal belonging in the channel trigger signal, entering Bluetooth disconnection interruption, and executing the following Step F:

Step F, determining whether the smart key device connects to the upper computer via the USB interface, if yes, turning off Bluetooth channel enable, turning on USB channel enable, clearing the identity identification, and exiting Bluetooth disconnection interruption; if no, turning off Bluetooth channel enable, clearing the identity identification, setting the dormancy identification, and exiting Bluetooth disconnection interruption;

when the instruction which does not need to perform an identity verification is an instruction for identity verification, the procedure of executing corresponding instruction operation according to the instruction, and returning corresponding instruction response to the upper computer comprises: clearing the identity identification at first, and then parsing the instruction for identity verification to get verification information, and determining whether the user's identity is legal according to the verification information, if yes, saving the identity identification, and returning a response that the identity is successfully verified to the upper computer according to the currently saved channel identification, if no, returning a response that the identity fails to be verified to the upper computer according to the currently saved channel identification;

after executing corresponding instruction operation according to the instruction, the method further comprises: determining whether needs to wait for keypad operation, if yes, after setting the keypad waiting identification, returning corresponding instruction response to the upper computer; if no, returning corresponding instruction response to the upper computer; and after entering keypad interruption, the method further comprising: determining whether the keypad waiting identification is setting, if yes, after executing keypad processing, exiting keypad interruption; if no, exiting keypad interruption directly.

5. The working method of claim 3, wherein when the interrupt trigger signal which is received by the smart key device is the Bluetooth connection signal belonging in the channel trigger signals, the step of entering Bluetooth connection interruption further comprising: matching the smart key device with the upper computer, if the smart key device matches the upper computer successfully, continuing to execute the Step D and Step E, if the smart key device does not match the upper computer successfully, displaying, by the smart key device, on LCD that the connection is failed, clearing the keypad waiting identification, and exiting Bluetooth connection interruption.

6. The working method of claim 1, wherein when the saved channel identification is a universal serial bus (USB), channel identification, the method further comprises turning off Bluetooth channel enable; when the saved channel identification is the Bluetooth channel identification, the method further comprises turning off USB channel enable.

7. The working method of claim 1, wherein said method comprises:
when the instruction which needs to perform identity verification before executing instruction operation is an instruction for setting algorithm and signature information, the step of executing corresponding operation according to the instruction and returning corresponding instruction response to the upper computer comprising: setting a signature algorithm, hash algorithm, getting the user's private key form key files, storing the private key into the memory, and returning instruction response for setting algorithm and signature information to the upper computer according to the currently saved channel identification;
when the instruction which needs to perform identity verification before executing instruction operation is an instruction for hashing message data, the step of executing corresponding instruction operation according the instruction and returning corresponding instruction response to the upper computer comprising: parsing the message data in the instruction to get key data and storing the data into a display buffer, performing Hash operation on the message data to get a hash result and save the hash result, and returning hash instruction response of the message data to the upper computer according to the currently saved channel identification;
when the instruction which needs to perform identity verification before executing instruction operation is an instruction for calculating signature, the step of executing corresponding instruction operation according to the instruction and returning corresponding instruction response to the upper computer comprising: displaying on LCD the key data in the display buffer, setting the keypad waiting identification, and returning instruction response of calculating signature to the upper computer according to the currently saved channel identification;
when the instruction which needs to perform identity verification before executing instruction operation is an instruction for obtaining keypad information, the step of executing corresponding instruction operation according to the instruction and returning corresponding instruction response to the upper computer comprising: executing operation of obtaining the keypad information, saving the obtained keypad information, and returning instruction response of obtaining the keypad information to the upper computer according to the currently saved channel identification; and
when the instruction which needs to perform identity verification before executing instruction operation, the step of executing instruction operation according to the instruction and returning corresponding instruction response to the upper computer comprising: executing operation of obtaining the signature result, saving the signature result, and returning instruction response of obtaining signature result to the upper computer according to the currently saved channel identification.

8. The working method of claim 1, wherein when the instruction which needs to perform identity verification before execute instruction operation is an instruction for switching channel, the step of executing corresponding instruction operation according to the instruction comprising: comparing an appointed channel identification in the instruction for switching channel with a currently saved channel identification, if they are the same as each other, returning response that channels are switched successfully to the upper computer according the currently saved channel identification; if the identifications are different from each other, changing the currently saved channel identification to the appointed channel identification, when the appointed channel identification is an universal serial bus (USB) channel identification, turning off Bluetooth channel enable, and turning on USB channel enable, when the appointed channel identification is the Bluetooth channel identification, turning off USB channel enable, and turning on Bluetooth channel enable.

9. The working method of claim 1, wherein the keypad processing comprises:
Step D-1, determining whether the keypad waiting identification is set, if yes, executing Step D-2; if no, exiting keypad interruption;
Step D-2, determining the keypad type, if the keypad is a page up/down keypad, executing Step D-3; if it is an enter keypad, executing Step D-4; if it is a canceling keypad, executing Step D-5;
Step D-3, displaying key information via page up/down keypad on LCD, when exporting all key information and displaying all key information, setting a mark for finishing displaying message as valid, and exiting keypad interruption;
Step D-4, determining whether the mark for finishing displaying message is valid, if yes, using the user's private key to sign the saved hash result; if no, displaying on LCD that operation is failure; if signature is successfully signed, displaying on LCD that operation is successful, and saving the signature result, if the signature is failure, displaying that operation is failure, and executing Step D-6;
Step D-5, displaying that operation is canceled on LCD, and then executing Step D-6; and
Step D-6, clearing the keypad waiting identification; and exiting keypad interruption.

10. The working method of claim 1, wherein before the smart key device receives the interrupt trigger signal, the method further comprises: prompting, by the smart key device, the user to choose a channel, and after the smart key device receiving user's information of choosing channel, setting and saving the channel identification.

11. A working method of a smart key device, characterized in that said method comprises the steps of:
Step S1, powering a smart key device so as ignite initialization;
Step S2, reading, by the smart card device, Bluetooth module parameters, and determining whether the Bluetooth module parameters are successfully read, if yes, switching the Bluetooth module to connection state and executing Step S3, if no, executing Step S3 directly;
Step S3, determining, by the smart key device, whether a working voltage of the smart key device is lower than a preset value, if yes, prompting a low voltage state, and turning off the smart key device after a first preset time; if no, executing Step S4;
Step S4, determining, by the smart key device, whether an interrupt identification exists, if yes, executing Step S5, if no, continuing to execute Step S3;
before Step S4, the method further comprises: turning on an interruption;

when the smart key device receiving an insert/pull universal serial bus (USB) trigger signal, entering insert/pull USB interruption, saving an insert/pull USB interrupt identification, and exiting insert/pull USB interruption;

when the smart key device receiving a Bluetooth connection/Bluetooth disconnection signal, entering Bluetooth connection/Bluetooth disconnection interruption, saving a Bluetooth connection/Bluetooth disconnection interrupt identification, and then exiting Bluetooth connection/Bluetooth disconnection interruption;

when the smart key device receives an instruction trigger signal, entering instruction interruption, saving an instruction interrupt identification and a current channel identification, and then exiting instruction interruption; wherein the instruction trigger signals includes a USB communication signal and a Bluetooth communication signal; and when the smart key device receiving a key trigger signal, entering key interruption, saving a key interrupt identification, and then exiting key interruption;

Step S5, determining, by the smart key device, type of the interrupt identification;

when the interrupt identification is the insert/pull USB interrupt identification, executing corresponding operation of USB channel, and then returning to Step S3;

when the interrupt identification is the Bluetooth connection/Bluetooth disconnection interrupt identification, executing corresponding operation of Bluetooth channel, and then returning to Step S3;

when the interrupt identification is the instruction interrupt identification, determining type of the instruction, if the received instruction is an instruction that needs to perform identity verification before executing corresponding instruction operation, performing identity verification, if the identity is verified successfully, executing corresponding instruction operation according to the instruction and returning corresponding instruction response to the upper computer, and returning to Step S3; if the identity verification fails, returning an error instruction response to the upper computer, and returning to Step S3; if the received instruction is an instruction that does not need to perform identity verification before executing corresponding instruction operation, executing corresponding instruction operation according to the instruction and returning corresponding instruction response to the upper computer, and returning to Step S3; wherein the process of executing corresponding instruction operation according to the instruction comprises: parsing message data in the instruction to get key data, performing Hash operation on the message data in the instruction to get and save a Hash result, and then displaying the key data on a liquid crystal display (LCD); and when the interrupt identification is a keypad interrupt identification, executing key processing, and then returning to Step S3; wherein the procedure of key processing comprises determining type of the keypad, if the keypad is an enter keypad, signing the saved Hash result to get a signature result and save the signature result, and if the keypad is a canceling keypad, canceling the signature result.

12. The working method of claim 11, wherein the step of executing corresponding operation of USB channel when the interrupt identification is the insert/pull USB interrupt identification comprising: if the interrupt identification is the pull USB interrupt identification, executing the following Step A:

Step A, turning off USB channel enable, turning on Bluetooth channel enable, clearing the pull USB interrupt identification, and clearing the identity identification;

if the interrupt identification is the insert USB interrupt identification, executing the following Step B and Step C:

Step B, determining, by the smart key device, whether it communicates with the upper computer via the Bluetooth interface, if yes, turning off Bluetooth channel enable, turning on the USB channel enable, clearing the insert USB interrupt identification and the identity identification, and then executing the following Step C; if no, turning on USB channel enable, clearing the insert USB interrupt identification, and then executing the following Step C;

Step C, clearing the keypad waiting identification, and displaying initialization on LCD;

when the interrupt identification is the Bluetooth connection/Bluetooth disconnection interrupt identification, the procedure of executing corresponding operation of Bluetooth channel comprising: if the interrupt identification is the Bluetooth connection interrupt identification, executing the following Step D and Step E:

Step D, determining whether the smart key device communicates with the upper computer via the USB interface, if yes, clearing the Bluetooth connection interrupt identification, and executing Step E; if no, turning on Bluetooth channel enable, clearing the Bluetooth connection interrupt identification and the identity identification, and executing Step E;

Step E, clearing the keypad waiting identification, and displaying initialization on LCD;

if the interrupt identification is the Bluetooth disconnection interrupt identification, executing the following Step F:

Step F, turning off Bluetooth channel enable, turning on USB channel enable, clearing the Bluetooth disconnection interrupt identification and the identity identification;

when the instruction which does not need to perform identity verification is an instruction for identity verification, the step of executing corresponding instruction according to the instruction and returning the corresponding instruction response to the upper computer comprising: when the instruction is the instruction for identity verification, clearing the identity identification, and parsing the instruction for identity verification to get verification information, and determining whether the user's identity is legal, if yes, saving the identity identification, and returning response that the identity is successfully verified to the upper computer according to the currently saved channel identification; if no, returning response that the identity fails to verified to the upper computer according the currently saved channel identification;

the step of executing corresponding operation according to the instruction further comprising: determining whether needs to wait for keypad operation, if yes, setting the keypad waiting identification, and then returning corresponding instruction response to the upper computer, if no, returning corresponding instruction response to the upper computer; and if the interrupt identification is the keypad interrupt identification, the method further comprising: determining whether the keypad waiting identification is set, if yes, executing keypad processing, and returning to Step S3; if no, returning to Step S3 directly.

13. The working method of claim 11, wherein when the interrupt identification is the insert/pull USB interrupt identification, the step of executing corresponding operation of USB channel comprising that if the identification is the pull USB interrupt identification, executing the following Step A:
Step A, turning off USB channel enable, turning on Bluetooth channel enable, and clearing the USB interrupt identification and the identity identification;
if the interrupt identification is the insert USB interrupt identification, executing the following Step B and Step C:
Step B, determining whether the smart key device communicates with the upper computer via the Bluetooth interface, if yes, clearing the insert USB interrupt identification, and executing Step C; if no, turning on USB channel enable, and clearing the insert USB interrupt identification and the identity identification, and executing Step C;
Step C, clearing the key wait identification, the LCD displaying initialization;
when the interrupt identification is the Bluetooth connection/Bluetooth disconnection interrupt identification, the procedure of executing corresponding operation of the Bluetooth channel comprising: if the interrupt identification is the Bluetooth connection interrupt identification, executing the following Step D and Step E:
Step D, determining whether the smart key device communicates with the upper computer via the USB interface, if yes, turning off USB channel enable, turning on Bluetooth channel enable, and clearing the Bluetooth connection interrupt identification and the identity identification, and then executing Step E; if no, turning on Bluetooth channel enable, and clearing the Bluetooth connection interrupt identification, and executing Step E;
Step E, clearing the keypad waiting identification, and displaying initialization on LCD;
if the interrupt identification is the Bluetooth disconnection interrupt identification, executing the following Step F:
Step F, determining whether the smart key device communicates with the upper computer via the USB interface, if yes, turning off Bluetooth channel enable, turning on USB channel enable, and clearing the Bluetooth disconnection interrupt identification and the identity identification; if no, clearing the Bluetooth disconnection interrupt identification and clearing the identity identification;
when the instruction which does not need to perform identity verification is the instruction for identity verification, the procedure of executing corresponding instruction operation according to the instruction, and returning corresponding instruction response to the upper computer comprising: when the instruction is the instruction for identity verification, clearing the identity identification, then parsing the instruction for identity verification to get verification information, and determining whether the user's identity is legal according to the verification information, if yes, saving the identity identification, and returning response that the identity is successfully verified to the upper computer according to the currently saved channel identification; if no, returning response that the identity fails to verify to the upper computer according to the currently saved channel identification;

after executing corresponding instruction operation according to the instruction, the method further comprising: determining whether it needs to wait for keypad operation, if yes, setting the keypad waiting identification, and then returning corresponding instruction response to the upper computer; if no, returning the corresponding instruction response to the upper computer directly; and when the interrupt identification is the keypad interrupt identification, the procedure further comprising: determining whether the keypad waiting identification is set, if yes, executing keypad processing and returning to Step S3, if no, returning to Step S3 directly.

14. The working method of claim 11, wherein when the saved channel identification is the USB channel identification, the method further comprises turning off Bluetooth channel enable; when the saved channel identification is the Bluetooth channel identification, the step further comprising turning off USB channel enable.

15. The working method of claim 13, wherein when the interrupt identification is the Bluetooth connection interruption identification, the method further comprises: matching the smart key device with the upper computer, if the smart key device matches the upper computer successfully, executing the Step D and Step E, if the device does not match the upper computer successfully, displaying on LCD, by the smart key device, that connection failure, and clearing the keypad waiting identification.

16. The working method of claim 11, wherein said method comprises:
when the instruction which needs to perform identity verification before executing instruction operation is an instruction for setting algorithm and signature information, the step of executing corresponding operation according to the instruction and returning corresponding instruction response to the upper computer comprising: setting a signature algorithm, hash algorithm and getting the user's private key from key files, and storing the private key into the memory, and returning instruction response for setting algorithm and signature information to the upper computer according to the currently saved channel identification;
when the instruction which needs to perform identity verification before executing instruction operation is an instruction for hashing message data, the step of executing corresponding instruction operation according the instruction and returning corresponding instruction response to the upper computer comprising: parsing the message data in the instruction to get key data and store the data into a display buffer, performing Hash operation on the message data to get hash result and save it, and returning hash instruction response of the message data to the upper computer according to the currently saved channel identification;
when the instruction which needs to perform identity verification before executing instruction operation is an instruction for calculating signature, the step of executing corresponding instruction operation according to the instruction and returning corresponding instruction response to the upper computer comprising: displaying key data in the display buffer on LCD, setting the keypad waiting identification, and returning instruction response of calculating signature to the upper computer according to the currently saved channel identification;

when the instruction which needs to perform identity verification before execute instruction operation is a keypad information instruction, the step of executing corresponding instruction operation according to the instruction and returning corresponding instruction response to the upper computer comprising: executing operation of obtaining the keypad information, saving the obtained keypad information, and returning instruction response of obtaining the keypad information to the upper computer according to the currently saved channel identification; and when the instruction which needs to perform identity verification before executing instruction operation, the step of executing instruction operation according to the instruction and returning corresponding instruction response to the upper computer comprising: executing operation of obtaining the signature result, saving the signature result, and returning instruction response of obtaining signature result to the upper computer according to the currently saved channel identification.

17. The working method of claim 11, wherein when the instruction which needs to perform identity verification before executing instruction operation is an instruction for switching channel, the step of executing corresponding instruction operation according to the instruction comprising: comparing the appointed channel identification in the instruction for switching channel with the currently saved channel identification, if the appointed channel identification and the currently saved channel identification are the same as each other, returning a response that channels are switched successfully to the upper computer according the currently saved channel identification; if the identifications are different to each other, changing the currently saved channel identification to the appointed channel identification, when the appointed channel identification is an USB channel identification, turning off Bluetooth channel enable, and turning on USB channel enable, and when the appointed channel identification is the Bluetooth channel identification, turning off USB channel enable, and turning on Bluetooth channel enable.

18. The working method of claim 11, wherein the keypad processing comprises:

Step D-1, determining whether the keypad waiting identification is set, if yes, executing Step D-2; if no, returning to Step S3 directly;

Step D-2, determining type of the keypad, if the keypad is a page up/down keypad, executing Step D-3; if the keypad is an enter keypad, executing Step D-4, if it is a canceling keypad, executing Step D-5;

Step D-3, displaying key information via page up/down keypad on LCD, when exporting all key information and displaying all key information, setting mark for finishing displaying message as valid;

Step D-4, determining whether the mark for finishing displaying message is valid, if yes, using the user's private key to sign the saved hash result; if no, displaying that operation is failure on LCD; if signature is successfully signed, displaying that operation is successful on LCD, and saving the signature result, if the signature is failure, displaying that operation is failure, and executing Step D-6;

Step D-5, displaying on LCD that operation is canceled, and then executing Step D-6; and Step D-6, clearing the keypad waiting identification.

19. The working method of claim 11, wherein after turning on interruption, the method further comprises that when receiving, by the smart key device, the timer trigger signal, entering timer interruption, saving timer interrupt identification, and then exiting timer interruption;

in Step S5, the step of determining type of interrupt identification further comprising: if the interrupt identification is the timer interrupt identification, resetting the timer, and clearing the timer interrupt identification.

20. The working method of claim 11, wherein after turning on interruption, the method further comprises that prompting, by the smart key device, the user to choose a channel on LCD, after receiving user's information of choosing channel, the smart key device setting and saving the channel identification.

* * * * *